US008776065B2

(12) United States Patent  
Podila (10) Patent No.: US 8,776,065 B2  
(45) Date of Patent: Jul. 8, 2014

(54) REAL TIME MONITORING AND TRACING OF SCHEDULER DECISIONS

(75) Inventor: Sharma R. Podila, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1886 days.

(21) Appl. No.: 11/601,115

(22) Filed: Nov. 16, 2006

(65) Prior Publication Data

US 2008/0120619 A1    May 22, 2008

(51) Int. Cl.  
*G06F 9/46*      (2006.01)

(52) U.S. Cl.  
USPC .......................................................... 718/102

(58) Field of Classification Search  
None  
See application file for complete search history.

(56) References Cited

U.S. PATENT DOCUMENTS

| | | | |
|---|---|---|---|
| 6,769,112 B1* | 7/2004 | Montana et al. | 717/101 |
| 6,804,738 B2* | 10/2004 | Weber | 710/244 |
| 2004/0093254 A1* | 5/2004 | Hirata et al. | 705/8 |

OTHER PUBLICATIONS

Cooke et al., "Relational Grid Monitoring Architecture (R-GMA)," 7 pages, 2003.  
Sun Microsystems, Inc., "N1 Grid Engine 6 Administration Guide," Part No: 817-5677-20 (May 2005), 220 pages.

\* cited by examiner

*Primary Examiner* — Mengyao Zhe  
(74) *Attorney, Agent, or Firm* — Osha Liang LLP (57) ABSTRACT

A system, apparatus, and method are directed to enabling a user to analyze real-time scheduling decisions of resources in a computing environment. A scheduler component maps jobs to resources, and schedule jobs for execution. In one embodiment, the scheduler component continually iterates, based on job characteristics, available resources, required resources, policies, or other constraints. While the scheduler component performs its tasks, a scheduling trace interface (STI) component may perform a trace of decisions made by the scheduler component, as well as collect static and/or dynamic state information used by the scheduler component. In one embodiment, the STI component may generate a snapshot of the scheduling decisions, and state information. A user interface may be employed to query the scheduling snapshots to monitor and analyze the scheduling decisions, and state information. In one embodiment, the user may then modify a job, the job's requirements, or the like, based on the analysis.

17 Claims, 6 Drawing Sheets

```
                                                          600
1.  % stimgr
2.  stimgr> showjob 1239135
3.  Job 129135
4.  Owner: User23
5.  ...
6.  [information including: # CPU, Memory, and the like]
7.  ...
8.  #available servers: 17
9.  #servers failing selection:  27
10. Server selection failures:
11. ...
12. server 1:
13.    freeprocessor: rqstd = 5.0; available = 4.8
14. server 2:
15.    freeprocessor: rqstd = 5.0; available = 4.8
16. server 3:
17.    freeprocessor: rqstd = 5.0; available = 2.4
18. ............
19. Dynamic Scheduling Results from Available Servers:
20. Server 4: Failed: CPU total = 11.9707 used = 10.0  asking = 5.0
21.  Scheduled to Start in 4 Seconds on server 'server 4,' expected runtime = 4 seconds
22. Stimgr> showback -1 server 4
23. Server: server 4
24. Class: server
25. Isalive: true
26. Isdiabled: false
27. TotProcessor: 14
28. AvailProcessor: 11.9707
29. TotRam: 49152
30. AvailRam: 3409.390625
31. ...
32. disk: /=2629, /export/home=47699, SCRATCH=47699,
33. Jobs scheduled in future: 12135, 129136, 129137, 129138, 129139
34. Jobs scheduled/running currently: 129126 129127
35. Current used slots: 10.0
36. Current used memory: 1024.0
37. #Jobs scheduled currently: 2
```

1. % stimgr
2. stimgr> showjob 1239135
3. Job 129135
4. Owner: User23
5. ...
6. [information including: # CPU, Memory, and the like]
7. ...
8. #available servers: 17
9. #servers failing selection: 27
10. Server selection failures:
11. ...
12. server 1:
13.    freeprocessor: rqstd = 5.0; available = 4.8
14. server 2:
15.    freeprocessor: rqstd = 5.0; available = 4.8
16. server 3:
17.    freeprocessor: rqstd = 5.0; available = 2.4
18. ............
19. Dynamic Scheduling Results from Available Servers:
20. Server 4: Failed: CPU total = 11.9707 used = 10.0 asking = 5.0
21.   Scheduled to Start in 4 Seconds on server 'server 4,' expected runtime = 4 seconds
22. Stimgr> showback -1 server 4
23. Server: server 4
24. Class: server
25. Isalive: true
26. Isdiabled: false
27. TotProcessor: 14
28. AvailProcessor: 11.9707
29. TotRam: 49152
30. AvailRam: 3409.390625
31. ...
32. disk: /=2629, /export/home=47699, SCRATCH=47699,
33. Jobs scheduled in future: 12135, 129136, 129137, 129138, 129139
34. Jobs scheduled/running currently: 129126 129127
35. Current used slots: 10.0
36. Current used memory: 1024.0
37. #Jobs scheduled currently: 2

*FIG. 6*

REAL TIME MONITORING AND TRACING OF SCHEDULER DECISIONS

FIELD OF THE INVENTION

The invention relates generally to managing computing resources, and more particularly but not exclusively to enabling real-time tracing of scheduling decisions in an allocation of computing resources.

BACKGROUND OF THE INVENTION

Distributed computing over a heterogeneous collection of resources has garnered a lot of interest from various industries, including technical and scientific computing, financial, agriculture, and manufacturing to name just a few. A core component in such an environment is a scheduler that schedules jobs and assigns resources to them. Large scale compute farms may comprise many resources such as execution hosts, software licenses, databases, applications, memory, or the like. Many users of these compute farms may submit numerous jobs that are to be scheduled and run in accordance with various site specific policies, scheduling constraints, or the like. In a highly utilized compute farm often times the demand for resources is larger than the available capacity. Therefore, there may often be jobs waiting to be executed as soon as resources become available. Ensuring the right job gets the right resources ahead of other jobs is often a problem.

Administrators and users of highly utilized computer farms often have a desire to be able to analyze decisions being made by the scheduler in order to ascertain that the right jobs are being run ahead of others, as well as to understand why certain jobs are not being run. This helps, for instance, in ensuring that time to market goals are met for critical projects. The inability and delays in determining why certain jobs are not running may result in wasted time, resources, and money. Therefore, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "job" refers to any unit of work executable by a computing device. Thus, a job may be a single program, or a group of programs that work together. In one embodiment, a job may also be a subset of a program, such as a subroutine, paragraph, function, or the like. In another embodiment, a job may be a script, an applet, or the like.

As used herein, the term "iteration" refers to a general repetition of a sequence of activities performed by a scheduler component for a mapping of jobs to resources (or resources to jobs). The loop or cycle of activities typically operates within a determined time period.

Briefly stated the invention is directed towards a system, apparatus, and method for enabling a user to access and analyze real-time scheduling decisions of resources in a computing environment. A scheduler component receives jobs and maps the jobs to resources, and further may schedule where and when the jobs may execute. In one embodiment, the scheduler component continually iterates its tasks, based on available resources, required resources, policies, or other constraints. While the scheduler component performs its tasks, a scheduling trace interface (STI) component may perform a trace of decisions made by the scheduler component, as well as collecting static and dynamic state information useable by the scheduler component. In one embodiment, the STI component may operate asynchronously to the scheduler component. In one embodiment, the STI component may request the information from the scheduler component. In one embodiment, the STI component may generate a snapshot of the scheduling decisions and/or state information. A user interface may be employed to query the scheduling snapshots to monitor and analyze the scheduling decisions, and state information. In one embodiment, the user interface includes a command line interface (CLI) set of commands that enable the user to query the scheduling snapshots. Information available from the scheduling snapshots may enable a user to determine a reason why a job may not be currently executing, view availability of resources, current workload on at least a part of the environment, view license constraints, as well as other possible constraints, such as policy constraints, service level agreements, or the like. In one embodiment, the user may be able to view information indicating when a job may be expected to start execution, complete execution, or the like. In one embodiment, the user may then modify a job, the job's requirements, or the like, based in part on the analysis. In one embodiment, the STI component manages the scheduling snapshots by maintaining them in memory. In another embodiment, scheduling snapshots that are not currently being accessed by a user may be deleted to minimize resource consumption.

Although the invention is disclosed within one embodiment of a compute farm environment, the invention is not so constrained, and may be employed within other scheduling environments, without departing from the scope of the invention. For example, load balancing environments may employ the invention. The invention may also be employed within an operating system where scheduling of various processes and/or resources may be performed. For example, in one embodiment, the invention may be implemented on a computing device to provide trace scheduling snapshots of how CPU, memory, and other resources being allocated.

Illustrative Operating Environment

Figure 1:
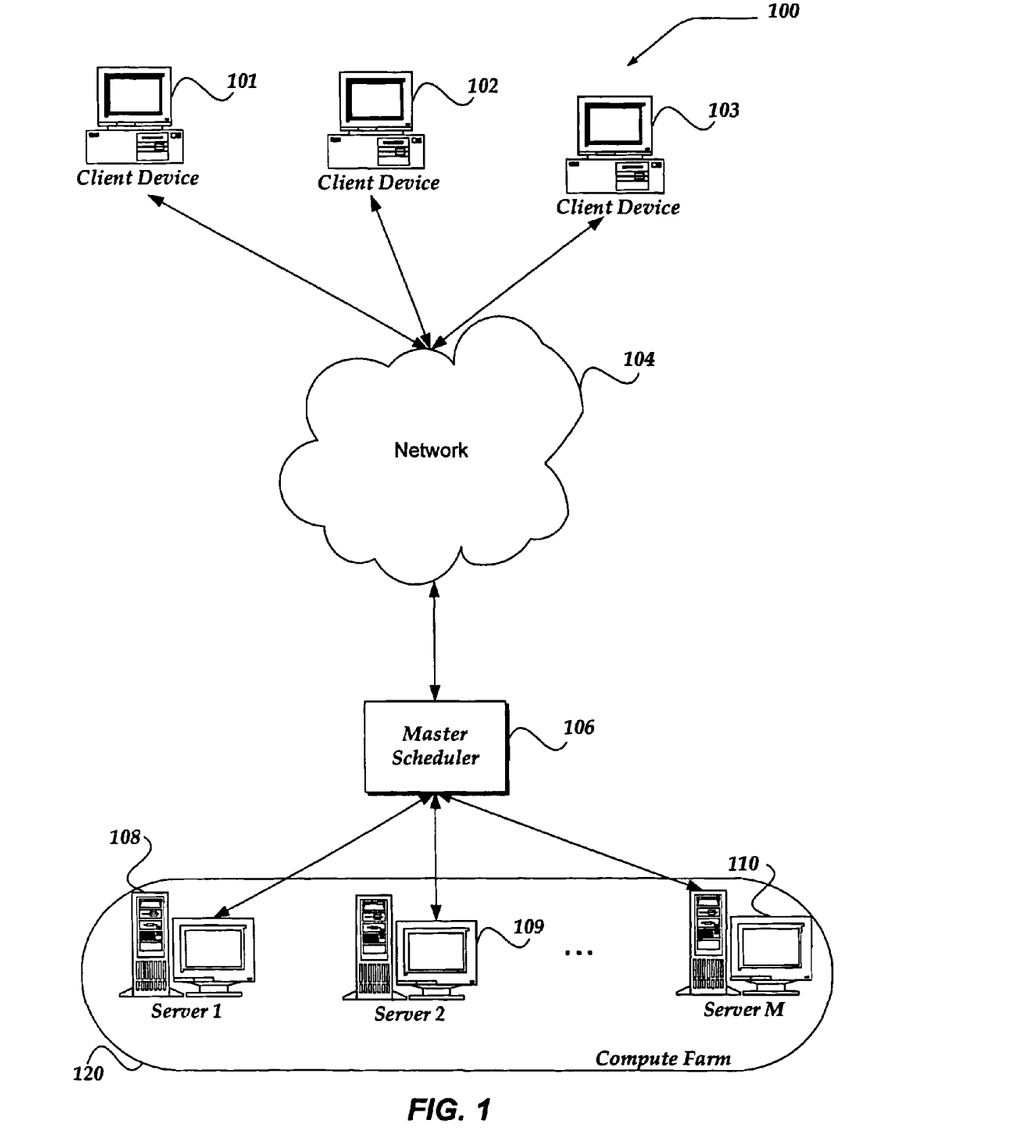
FIG. 1 shows a functional block diagram illustrating one embodiment of an environment for practicing the invention.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 101-103, network 104, master scheduler 106, and servers 108-110. Client devices 101-103 are in communication with master scheduler 106 through network 104. Master scheduler 106 is in further communication with servers 108-110. In one embodiment, as shown, servers 108-110 may operate within a compute farm 120. Although not shown, master scheduler 106 may be in communication with servers 108-110 through a network infrastructure that is similar to network 104. Moreover, master scheduler 106 may also be included within compute farm 120.

Generally, client devices 101-103 may include virtually any computing device capable of connecting to another computing device to send and receive information, including emails, requests for information from a server, submission of a job to be executed on at least one of servers 108-110, querying status requests, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client devices 101-103 may be any device that is capable of connecting using a wired or wireless communication medium such as a PDA, POCKET PC, wearable computer, and any other device that is equipped to communicate over a wired and/or wireless communication medium.

Client devices 101-103 may further include a client application that is configured to manage various actions. Moreover, client devices 101-103 may also include a web browser application that is configured to enable a user to interact with other devices and applications, over network 104. In one embodiment, the web browser is configured to provide various functions, including, but not limited to, authentication, enabling multiple requests for information, submit a job, or the like.

Client devices 101-103 may also include other client applications, such as might enable access to another computing device, perform queries for status of a job, submit a job for execution, receive results of a job, or the like.

Network 104 is configured to couple client devices 101-103, with other network devices, such as master scheduler 106. Network 104 is enabled to employ any form of computer readable media for communicating information from one electronic device to another. In one embodiment, network 104 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks may enable wide area coverage for network devices, such as client devices 101-103, or the like, with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, network 104 includes any communication method by which information may travel between client devices 101-103 and master scheduler 106.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Master scheduler 106 includes virtually any device that manages requests for a resource. Such devices include, for example, load balancers, cluster masters, master servers for a compute farm, or the like. Master scheduler 106 may, for example, control the flow of data packets delivered to and forwarded from an array of servers, such as servers 108-110. Master scheduler 106 may direct a request for a resource to a particular server based on a capacity of a server, resources requested, and a host of other mechanisms. For example, master scheduler 106 may direct a request for a job to be executed on a server based on such parameters as a physical characteristic of a server, available resources within a server, a capacity of a server, a service level agreement, one or more policies, a characteristic of a job, including, for example, an amount of resources requested by the job, size of the job, anticipated time of execution of the job, or the like. Virtually any criteria may be employed by master scheduler 106 to direct and schedule a job to a server within servers 108-110. Master scheduler 106 may also queue one or more jobs to be submitted to a server within servers 108-110, when a resource is presently unavailable for the job. Moreover, master scheduler 106 is further configured to receive a response, or result from a job or other request, and to forward the response to one or more of client devices 101-103.

Master scheduler 106 may further provide an interface for client devices 101-103 to query scheduling decisions. In one embodiment, the interface is a command line interface (CLI), wherein a user of client devices 101-103 may employ a variety of commands, including for example, those described below in conjunction with FIG. 5. However, the invention is not so limited, and other user interfaces may also be provided, including, but not limited to a window interface, a menu interface, or the like.

Master scheduler 106 may be implemented in any of a variety of network devices, including one or more personal computers, servers, multiprocessor systems, microprocessor-based or programmable consumer electronics, network PCs, radio frequency (RF) devices, infrared (IR) devices, integrated devices combining one or more of the preceding devices, or the like. An embodiment of a network device that could be used as master scheduler 106 is network device 200 of FIG. 2.

Servers 108-110 (1-M) may include any computing device capable of communicating network packets with another computing device, such as master scheduler 106, or the like. Each packet may convey a piece of information. A packet may be sent for handshaking, e.g., to establish a connection or to acknowledge receipt of data, or the like. The packet may include information such as a request, a response, or the like. In one embodiment, the packet may include a job to be executed on at least one of servers 108-110. In another embodiment, the packet include a response associated with one or more jobs, and may be sent to master scheduler 106, or even at least one of client devices 101-103. Thus, in one embodiment, although not illustrated, results of a job may be directed towards a client device, rather than through master scheduler 106.

Generally, packets received and or sent by servers 108-110 will be formatted according to TCP/IP, but they could also be formatted using another transport protocol, such as User Datagram Protocol (UDP), Internet Control Message Protocol (ICMP), NETheui, IPX/SPX, token ring, a proprietary protocol format, or the like. Moreover, the packets may be communicated between servers 108-110, master scheduler 106, and client devices 101-103 employing HTTP, HTTPS, or the like.

In one embodiment, servers 108-110 may operate as compute servers, configured to receive a job and to execute the job. For example, servers 108-110 operate to perform messaging jobs, File Transfer Protocol (FTP) jobs, database jobs, perform web services, print services, or any of a variety of other types of jobs. For example, in one embodiment, servers 108-110 may be configured to receive a job that may simulate a hardware device, perform analysis about a hardware component, perform a statistical analysis, generate and/or test software components, or the like.

Additionally, each of servers 108-110 may be configured to perform a different operation. Thus, for example, server 108 may be configured as statistical analysis system with special licenses for employing statistical programs, while server 109 may be configured as a database server with associated licenses for use of the database. Further, one of servers 108-110 may be configured to operate as a print server, with communication to a plurality of printers. Thus, in one embodiment, a job may include instructions for printing.

Moreover, each of servers 108-110 may be configured with different software and/or hardware components, including different licenses, applications, memory, processors, or the like. In one embodiment, various resources of each of servers 108-110 may be managed by a use policy, service level agreement, or the like. However, in another embodiment, servers 108-110 may also be configured the same, without departing from the scope of the invention.

In addition, in one embodiment, servers 108-110 may be configured to operate within a compute farm, such as compute farm 120. As such, servers 108-110 may receive jobs from master scheduler 106. Moreover, in one embodiment, at least one of servers 108-110 may be configured to operate to perform actions of master scheduler 106, should master scheduler 106 fail, or otherwise is uncommunicative.

Devices that may operate as servers 108-110 include personal computers desktop computers, multiprocessor systems, microprocessor-based or programmable consumer electronics, network PCs, servers, or the like.

Illustrative Scheduler Environment

Figure 2:
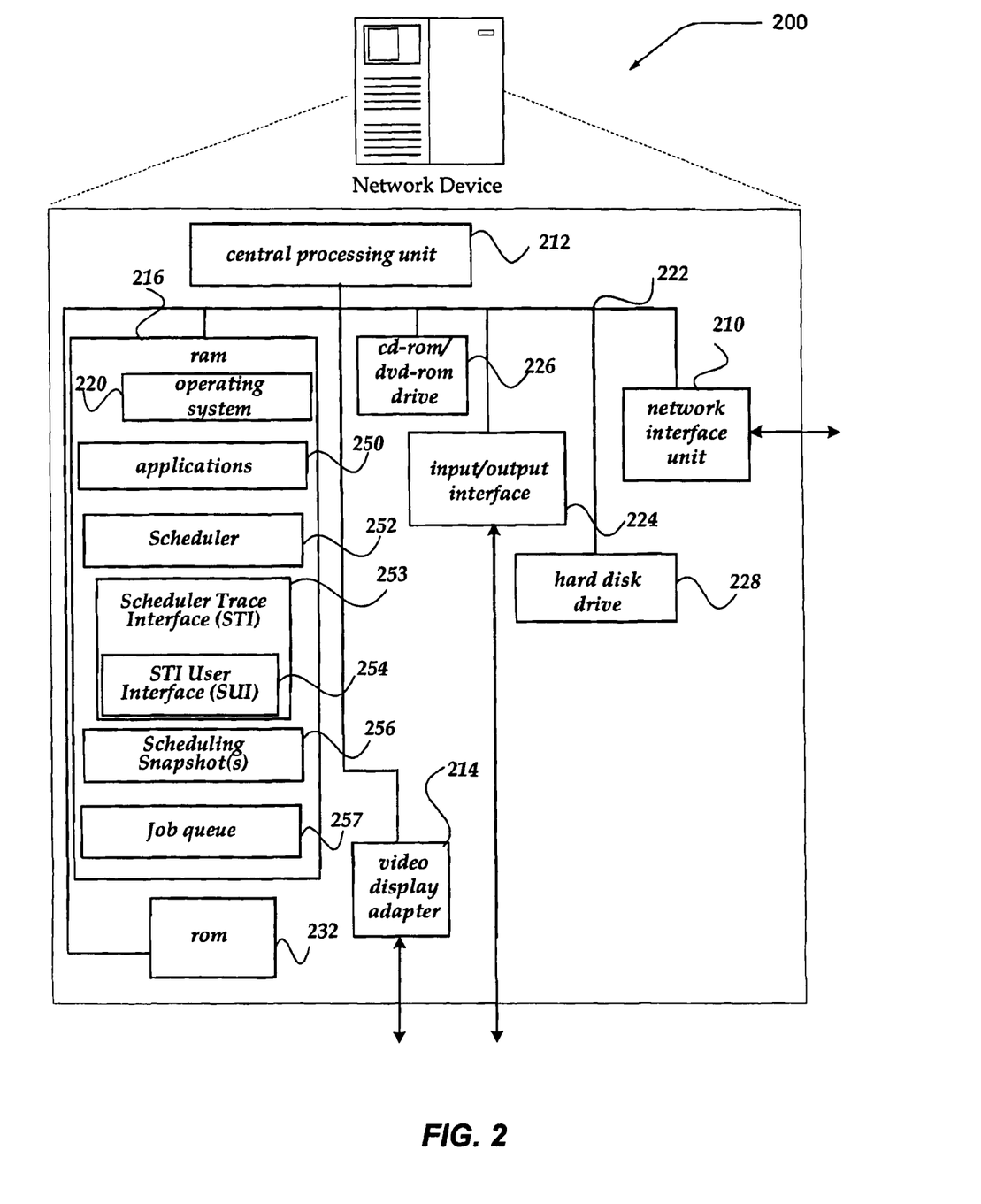
FIG. 2 shows one embodiment of a network device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, master scheduler 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed.

As illustrated in FIG. 2, network device 200 also can communicate with the Internet, or some other communications network, such as network 104 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, or the like. Similarly, network device 200 may include applications that support a variety of tunneling mechanisms, such as VPN, PPP, L2TP, and so forth.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, or the like.

The mass memory also stores program code and data. One or more applications 250 are loaded into mass memory and run on operating system 220. Examples of application programs may include email programs, routing programs, schedulers, calendars, database programs, word processing programs, HTTP programs, security programs, and so forth. Mass storage may further include applications and/or data such as scheduler 252, Scheduler Trace Interface (STI) 253, STI user interface (SUI) 254, scheduling snapshots 256, and job queue 257.

Job queue 257 may include virtually any mechanism configured to receive information associated with a job, including, for example, the job itself, and to manage the job. In one embodiment, the job may be sent to a server, such as one of servers 108-110 of FIG. 1 for execution. In one embodiment, job queue 257 may include pointers or other identifiers associated with a job, which server or resource the job is to be assigned to, or the like, when the resource becomes available. In another embodiment, the job may reside on hard disk drive 228, until it is sent to a server or other resource for execution.

Scheduler 252 is configured to manage jobs and resources for use by one of more jobs. Thus, in one embodiment, scheduler 252 may map jobs to resources, schedule the job, and direct the job to be sent for execution to a server, or similar resource. Scheduler 252 may obtain a list of the jobs to be managed from job queue 257, add jobs to job queue 257, or remove jobs from job queue 257.

Scheduler 252 may perform its tasks of scheduling and allocating jobs to resources, iterating through job queue 257, virtually continuously. Scheduler 252 may thus, in one embodiment, perform its tasks over a plurality of iterations, where an iteration may be performed in real-time. Scheduler 252 may make a plurality of scheduling decisions based on characteristics of jobs in job queue 257, jobs currently executing, resources available, resources currently unavailable, or the like. For example, scheduler 252 may schedule jobs based on hardware and/or software required to perform a job, and hardware and/or software available, or to become available for performing the job. Scheduler 252 may also make various scheduling decisions based on licensing constraints, scheduling policies, or the like. A scheduling policy may include additional constraints on a job. For example, in one embodiment, a scheduling policy may restrict a number of jobs from a particular client device, user or the like, to a particular time, particular server, place a restriction on an amount or type of resource consumed during a given time period, or the like. Thus, scheduler 252 may employ any of a variety of criteria, to schedule a job for execution.

STI 253 may operate, in one embodiment, as an asynchronous service thread to perform traces on scheduling decisions made by scheduler 252. In one embodiment, STI 253 may be spawned by scheduler 252.

STI 253 may operate to collect virtually all information employable by scheduler 252 for its scheduling decisions during an iteration. Such information may include both static resource availability information as well as dynamic availability information including a currently running workload on one or more servers. For example, STI 253 may obtain information that indicates whether a job is not able to run currently because it could not find sufficient processing capacity, memory capacity, licenses, or the like. STI 253 may further obtain information indicating when the job is expected to start, what resources are expected to be used by the job, or the like. STI 253 thus, may obtain information about virtually any constraint that may be limiting the job from running at a given moment, and when the constraints are expected to no longer limit the job from executing.

Thus, STI 253 may obtain information about a configuration of each server, including number of processors (CPUs), amount of memory, disk space, licenses, applications, printers, applicable service level agreements for a server or an aspect of the server, or the like. STI 253 may also obtain information about what jobs are currently executing on each server, what resources each job is currently consuming, what service level agreements, policies, or the like that may apply to each job, and when each job is anticipated to be completed. STI 253 may further obtain information about what jobs are scheduled to run on each server, what resources each job is expected to consume, when the job is anticipated to execute, how long the job is expected to take, what service level agreements, policies, or the like that may apply to each job, or the like.

STI 253 may provide the information obtained during an iteration of scheduler 252, and store the information to scheduling snapshots 256. In one embodiment, each scheduling snapshot 256 is organized consistently in that it includes virtually all of the scheduling decisions made during a given scheduling iteration, status of each job (whether currently executing, or in job queue 257), the status of each of the resources at a beginning and/or at an end of an iteration, as well as any other related static and/or dynamic information.

STI 253 may further provide a user interface, such as STI user interface (SUI) 254. In one embodiment, SUI 254 is configured as an API to STI 253. In one embodiment, SUI 254 is a CLI that may enable a user to query scheduling snapshots 256. For example, in one embodiment, SUI 254 may include such CLI commands as those described below in conjunction with FIG. 5. In one embodiment, SUI 254 provides a UNIX shell like environment where users may interactively run various commands at an STI prompt. Examples of such commands are provided in FIG. 5. The invention is not limited to CLI interfaces, however, and other types of user interfaces may be employed, including, but not limited, for example, to a browser interface, a menu interface, a scripting interface, other shell type interfaces, or the like.

In any event, SUI 254 may enable a user (administrator), or the like, to see information that shows why a job is not running at the moment, and also query what resources are available along with their status. In one embodiment, SUI 254 enables the user to query information based on a most currently available scheduling snapshots 256. Thus, when a user makes a request for status, STI 253 (through SUI 254) selects the most current scheduling snapshot from scheduling snapshots 256 to provide the information. In one embodiment, as STI 253 provides access to a scheduling snapshot, that scheduling snapshot may become assigned to a user until the user releases the scheduling snapshot. More than one user, however, may access the same scheduling snapshot. A user may periodically request another scheduling snapshot from scheduling snapshots 256. In which case, STI 253 may provide the most currently available scheduling snapshot. In one embodiment, a request for another scheduling snapshot 256 may automatically release a presently assigned scheduling snapshot assigned to the user.

STI 253 may periodically review the status of scheduling snapshots 256, and delete those scheduling snapshots 256 that are not currently assigned to a user. In one embodiment, scheduling snapshots 256 may reside in memory, such as RAM 216. Thus, dropping unused scheduling snapshots 256 is directed towards minimizing a memory footprint used during the scheduling process. In one embodiment, however, STI 253 may select to preserve unassigned scheduling snapshots for a previous N number of iterations, where N may be greater than one.

STI 253 is configured, in one embodiment, to operate asynchronously from scheduler 252, thereby, minimizing any overhead on scheduler 252 that may arise due to user queries. Moreover, STI 253 is configured to manage a plurality of user concurrently.

Figure 3:
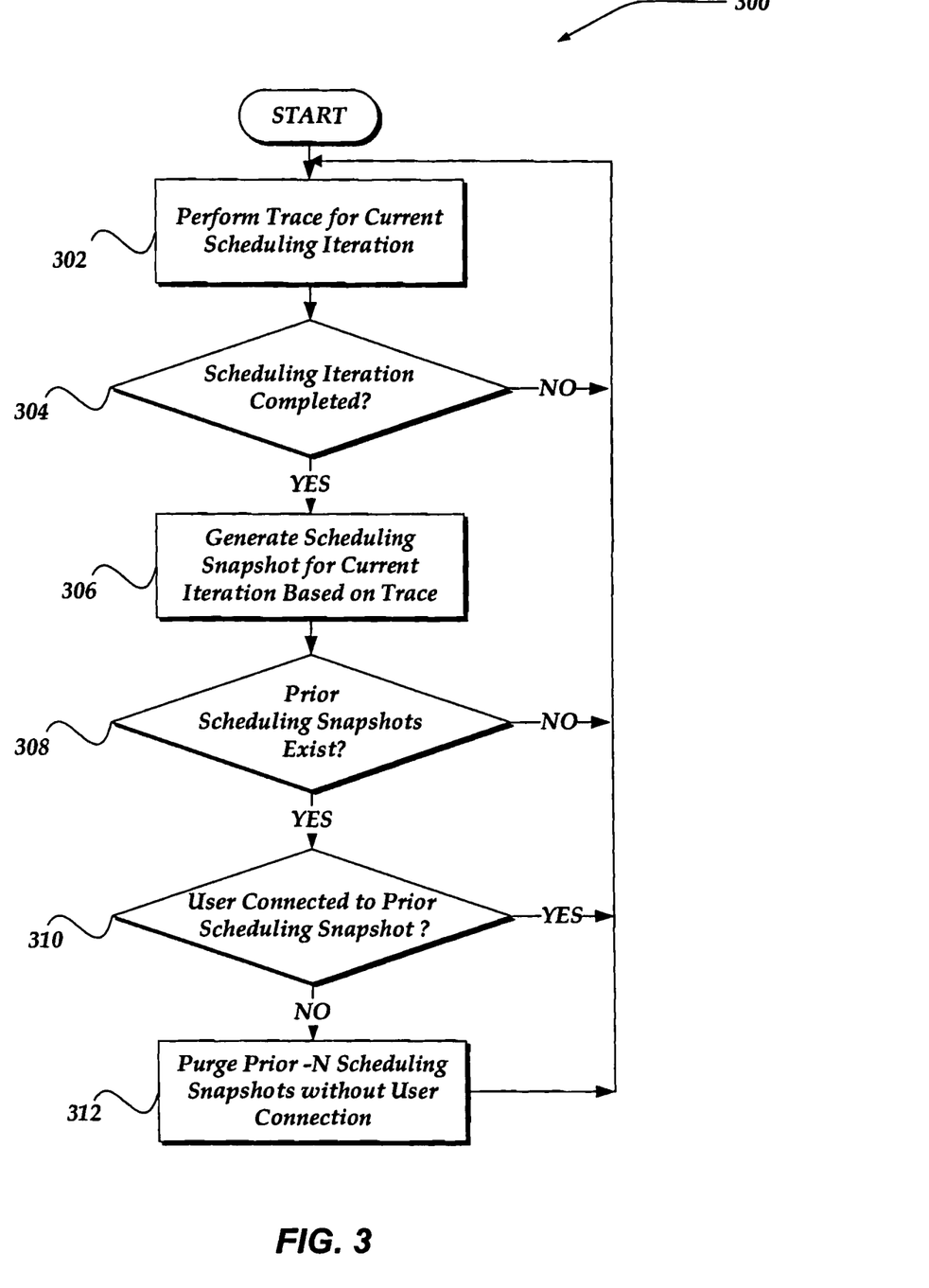
FIG. 3 illustrates a logical flow diagram generally showing one embodiment of a process for obtaining and managing real-time trace scheduling snapshots of resource scheduling decisions.

STI 253 may perform at least some of its actions using a process substantially similar to process 300 of FIG. 3 below. Moreover, STI 253 may perform complementary actions to those user actions described below in conjunction with process 400 of FIG. 4.

Generalized Operation

The operation of certain aspects of the invention will now be described with respect to FIGS. 3-4, and 6. FIG. 3 illustrates a logical flow diagram generally showing one embodiment of a process for obtaining and managing real-time trace scheduling snapshots of resource scheduling decisions. Process 300 of FIG. 3 may be implemented with master scheduler 106 of FIG. 1.

Process 300 begins, after a start block, at block 302, where a scheduler may be performing scheduling decisions during a scheduling iteration. At block 302, a trace may be performed to gather information about the scheduling decisions, as well as static and dynamic information useable by the scheduler in making the scheduling decisions. Such information obtained during the trace includes that information described above. In one embodiment, the trace may be performed by querying the scheduler for the information. In another embodiment, the trace may be performed by examining a memory location where the scheduler may store scheduling decisions, as well as related information. Processing flows to decision block 304 where a determination is made whether the scheduling iteration is completed. In one embodiment, such determination may be made based on a status of a flag, a procedure call, a memory location, an interrupt bit, or any of a variety of communication signals, or the like. In any event, if the scheduling iteration is not yet completed processing loops back to block 302; otherwise, processing flows to block 306.

At block 306, a scheduling snapshot for the currently completed scheduling iteration is generated based on the trace. In one embodiment, a scheduling snapshot may be stored in memory. In another embodiment, the scheduling snapshot may be saved to a more permanent storage location, such as a disk drive, or the like. Moreover, in one embodiment, the scheduling snapshot may be created during block 302, populated during block 302, and released for use by a user, during block 306. In one embodiment, the scheduling snapshot is organized into data structures. In one embodiment, the scheduling snapshot is organized as database structures. However, the invention is not so constrained, and virtually any format of the scheduling decisions, and related static/dynamic information may be used, without departing from the scope or spirit of the invention.

Processing flows next to decision block 308 where a determination is made whether there exists scheduling snapshots for prior scheduling iterations. If so, processing proceeds to decision block 310; otherwise, processing may loop back to block 302 to perform a trace for another scheduling iteration.

At decision block 310, a determination is made whether any user is connected to (currently assigned to) the prior scheduling snapshot(s). If so, then the prior scheduling snapshot is retained, and processing may loop back to block 302 to perform a trace for another scheduling iteration. Otherwise, processing may flow to block 312.

At block 312, prior scheduling snapshots that are not currently assigned to any user, may be purged or otherwise deleted. In one embodiment, some of the prior scheduling snapshots may be purged, while less than some number "back in time" may be preserved. In one embodiment, prior scheduling snapshots may also be stored in an area. For example, in one embodiment, prior scheduling snapshots may be stored for use at some later time, in performing analysis, improving actions by the scheduler, modifying service level agreements, policies, server configurations, or the like.

Although process 300 appears to illustrate that various actions, such as described in blocks 308, 310, and 312, the invention is not so limited. Thus, for example, while a trace is being performed at block 302, actions from blocks 308, 310, and/or 312 may also be performed, concurrently. Moreover, process 300 may be performed for as long as desired, until the scheduler is terminated, or based on a variety of other criteria.

Figure 4:
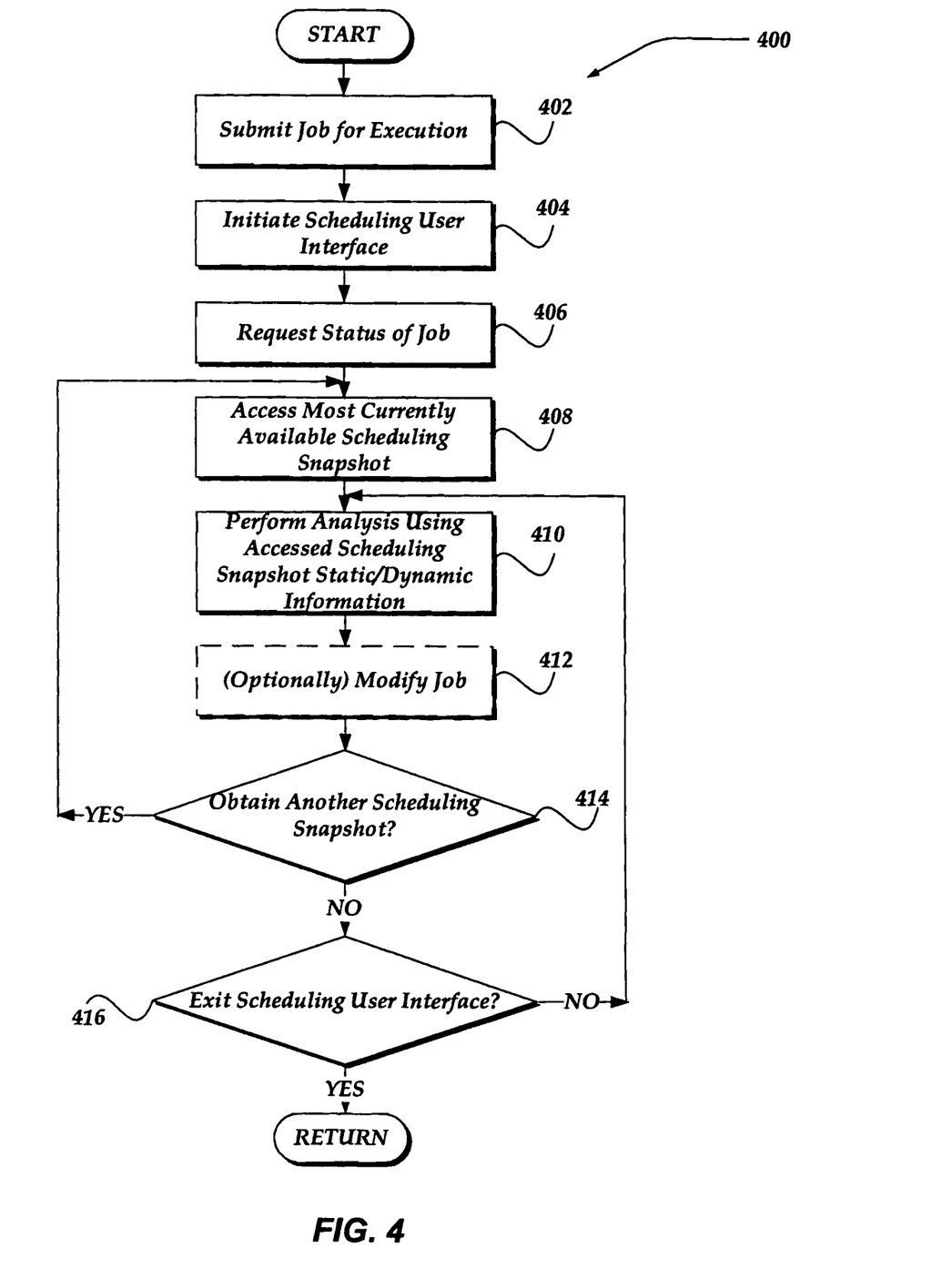
FIG. 4 illustrates a logical flow diagram generally showing one embodiment of a process for employing real-time scheduling snapshots to manage a compute job.

FIG. 4 illustrates a logical flow diagram generally showing one embodiment of a process for employing real-time scheduling snapshots to manage a compute job. In one embodiment, process 400 of FIG. 4 represents actions that may be performed by a user of client devices 101-103 of FIG. 1. In one embodiment, complementary actions to process 400 may be performed by master scheduler 106 of FIG. 1.

As illustrated, process 400 may begin, after a start block, at block 402, where a user may submit a job for execution. In one embodiment, the job may be received by a scheduler or placed within a job queue to be scheduled for execution as resources become available for the job.

Processing proceeds next to block 404, where the user may select to monitor status of the submitted job (or another job). In one embodiment, the user may initiate a scheduling STI user interface (SUI). Thus, in one embodiment, the user may send a command to start the SUI.

Processing then continues to block 406, where the user may provide query commands to request status of one or more jobs. Processing continues to block 408, where the request is received by the STI, or the like, which may access a most currently available scheduling snapshot, and assign it to the user. Processing flows next to block 408, where information may be provided to the user regarding the status of the requested job, based on information within the assigned scheduling snapshot.

Process 400 continues to block 410, where the user may submit any of a variety of other available commands to enable further analysis of the status of the job. The STI may format and provide responses to the requests, based on the scheduling decisions, and the related static/dynamic information in the scheduling snapshot. To help illustrate block 410 (and other actions), a use case example is described in more detail below in conjunction with FIG. 6.

Processing may then optionally flow to block 412, where, based in part on the analysis of the received information in block 410, the user may modify the job, constraints on the job, or the like. In one embodiment, the user may, for example, elect to terminate the job.

In any event, processing flows next to decision block 414, where the user may request another scheduling snapshot to obtain the latest status of the job (or jobs). The user may do this, because during block 404, 406, 408, 410, and 412, the schedule may be iterating through more scheduling decisions, and therefore, conditions, and the status of the jobs may have changed. Therefore, the snapshot the user may currently be examining may be out of date. Therefore, the user may request another scheduling snapshot. If so, processing flows to block 408; otherwise, processing flows to decision block 416.

At decision block 416, a determination is made whether the user is requesting to exit the SUI. If so, processing then returns to a calling process to perform other actions. Otherwise, processing may loop back to block 410 to continue as described above.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative User Interface Commands

Figure 5:
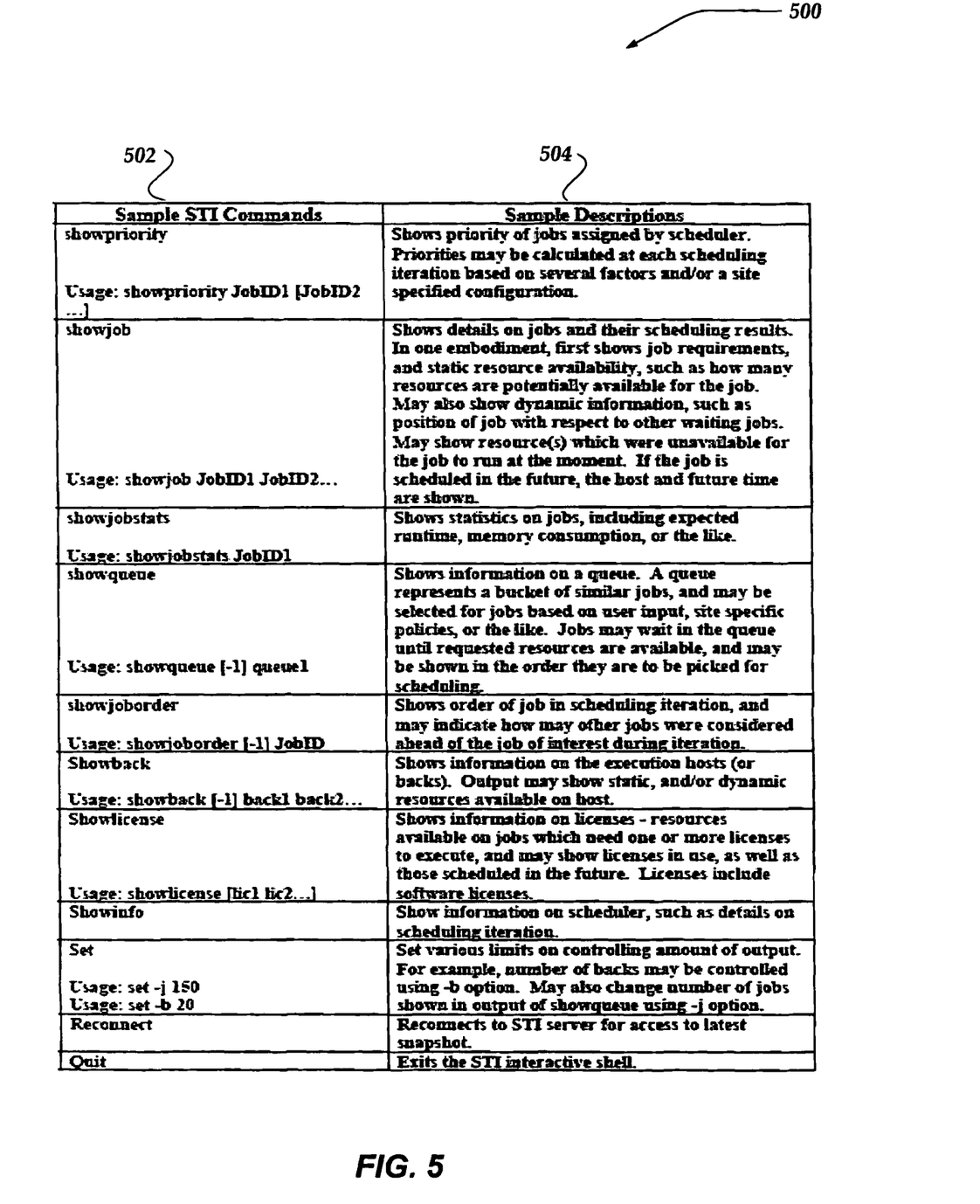
FIG. 5 illustrates one embodiment of example user interface commands useable in analyzing real-time resource scheduling decisions.

FIG. 5 illustrates one embodiment of example user interface commands useable in analyzing real-time resource scheduling decisions. As shown interface table 500 includes example commands 502 and accompanying command descriptions 504. Not all of commands 502 may be required to practice the invention, and variations in the arrangement, use, and type of the commands may be made without departing from the spirit or scope of the invention. Moreover, shown are merely illustrative examples, and is therefore not intended to limit or otherwise narrow the invention. Thus, for example, a window interface, menu of commands or the like may be employed without departing from the scope of the invention.

As shown, various commands 502 may be employed by a user to query status of one or more jobs, and to otherwise generally communicate with the scheduler trace interface (STI) described above. For example, the showpriority command may be employed to determine a priority of a job. The showjob command may be employed to provide details on a job based on information in a scheduling snapshot, as described in descriptions 504. Similarly, showinfo may be use to obtain such details as how long an iteration took, or other information.

Showjobstats may provide statistics on a job, including, but not limited to expected execution time for a job, resources consumed by a job, or anticipated to be consumed, or the like. Similarly, the showqueue command may provide information about which jobs are in the job queue, as well as related resources to be assigned to the job, constraints on the job, or other information. The command showjoborder may provide the user with visibility on an ordering of jobs in a scheduling iteration, how many other jobs may be before a job, or the like.

Commands such as showback enables the user to obtain information about a particular server, including its static characteristics (memory size, processors, licenses, applications, and the like), as well as dynamic characteristics (e.g., jobs currently executing, resources consumed, and the like). Showlicense may provide more details regarding one or more licenses. Licenses may provide constraints on use of a resource, such as an application. Thus, for example, a license might indicate that only X number of concurrent users (jobs) may execute using a given application. Thus, showlicense may provide information about resources available, which jobs may need a license to execute, how many licenses are in use, aw well as how many may be currently scheduled for use in the future.

The set command enables the user to vary information provided in one or more of commands 502. Thus, for example, set –j may change a number of jobs shown in an output of showqueue, while set –b may modify a number of servers shown in the output from one of the above commands 502. It should be noted that any of a variety of other options may also be provided, without departing from the scope of the invention. For example, a –v option may be employed to enable verbose information to be provided, a –l may be used to provide long listings, or the like. Moreover, each of the commands, as well as other commands, may employ a variety of options with the command. In addition, a command may employ more than one option, without departing from the scope of the invention.

Figure 6:
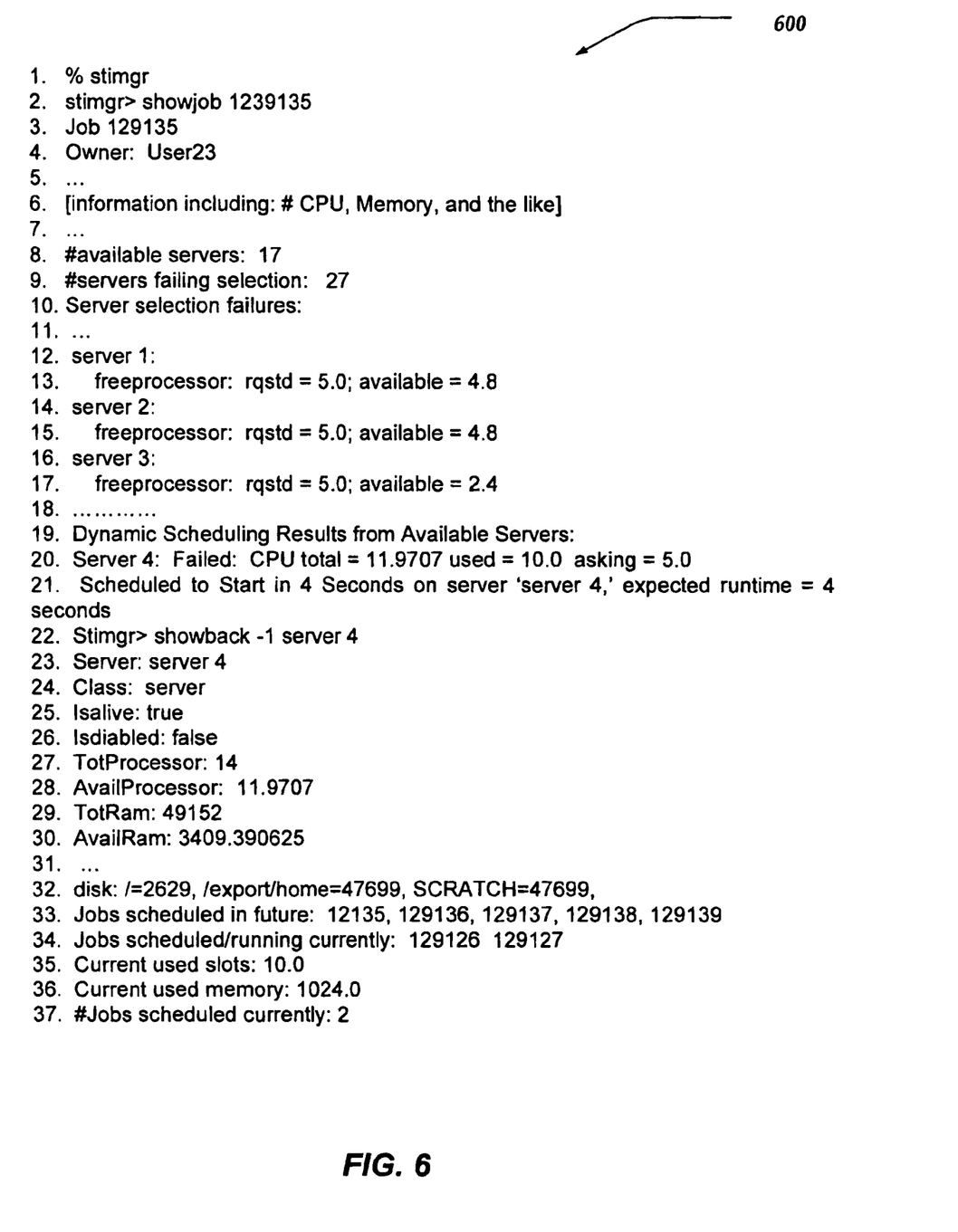
FIG. 6 illustrates an example use case of querying real-time resource scheduling decisions, in accordance with the invention.

FIG. 6 illustrates an example use case of querying real-time resource scheduling decisions, using some of the commands described in FIG. 5, to better appreciate how such commands 502 may be employed.

In use case 600 of FIG. 6, a user is querying the status of a job, with Job ID 129135. The job appears not to be running at the moment. At line 1 of use case 600, the user initiates the STI user interface, and at line 2, the user employs the showjob command may be used to find out what the status is of job 1239135. As shown in the figure, at lines 4-11 a variety of information may be provided to the user, including such as there are 17 execution servers (line 8) that qualify to run this job and 27 others that do not (line 9). In addition, (lines 4-7) various information, including an owner of the job, and requested resources for execution of the job (lines 5-7) may also be provided.

For each server that does not qualify, information about why it does not qualify (see, for example, lines 12-18) is shown. For example, line 13 illustrates that server 1 has available 4.8 processors, but the job requests 5.0 processors. Thus, there is presently insufficient processing capacity for the job on server 1.

In addition, dynamic scheduling information for the job may also be provided. As shown, at the moment, CPU resources are preventing the job from running (see lines 19-20), and that the job is expected to run in 4 seconds on server 4.

The example use case 600 further illustrates that use of the showback command (line 22) for server 4 (using a long listing option, −1) provides resource information for server 4. It also illustrates the currently executing jobs as well as the jobs scheduled to run on server 4 in the future, including job 129135 (lines 23-37).

Thus, through the use of a variety of queries, the user is provided with a real-time capability of determining status of a job, whether it is currently executing, and if not why not, and when it is anticipated that the job will run. Through the queries, the user may determine when resources are expected to become available for a job, what constraints may be delaying a job, including licenses, policies, or the like. The user may also obtain information that indicates that some resources may be already reserved in advance for other jobs, and therefore may be delaying the job of interest.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing scheduling decisions for computer resources, comprising:
    a transceiver for receiving and sending information;
    a scheduler configured to receive and to schedule jobs to resources; and
    a scheduling trace interface component that is programmed to perform actions, including:
    tracing scheduling decisions;
    enabling access to at least one user contents of the scheduling snapshot for use in analyzing a status of a job to determine why the job is not currently executing; and
    enabling access to at least one user contents of the scheduling snapshot for use in analyzing a status of a job to determine when the job is scheduled to execute,
    wherein enabling access to at least one user contents of the scheduling snapshot for use further comprises providing an interface set of commands including a command to show a priority of a job, a command to show details of a job including the job's resource requirements, a command to show statistics on a job, a command to indicate license availability, and a command to show a policy constraint affecting a job.

2. The network device of claim 1, wherein information includes at least one from a group consisting of a number of available licenses, a policy, a number of available resources, a job, and a time the job is anticipated to start execution.

3. The network device of claim 1, further comprising:
    generating another scheduling snapshot, based on tracing other scheduling decisions performed by the scheduler, wherein the other scheduling decisions occur during a different iteration of the scheduler than the scheduling decisions.

4. The network device of claim 3, further comprising:
    if the scheduling snapshot is unassigned to at least one user, deleting the scheduling snapshot.

5. The network device of claim 1, wherein enabling access to at least one user contents of the scheduling snapshot further comprises providing a command line interface (CLI) for use in requesting at least some of the scheduling decisions, static information, and dynamic information.

6. The network device of claim 1, wherein the scheduling trace interface is configured to execute asynchronously of the scheduler.

7. The network device of claim 1, wherein information indicates at least one from the group consisting of whether a resource is already consumed, and whether a policy or a licensing constraint is at least part of a reason why the job is not currently executing.

8. The network device of claim 1, wherein information indicates whether resources requested for the job are currently assigned to another job.

9. A method of managing scheduling decisions of resources over a network, comprising:
    tracing scheduling decisions performed by a resource scheduler in iteratively scheduling jobs to resources;
    obtaining information useable by the resource scheduler during iteratively scheduling of the jobs;
    iteratively providing the scheduling decisions and the information to one of a plurality of scheduling snapshots, wherein each scheduling snapshot is associated with a different iteration of the resource scheduler; and
    providing a user interface that enables a user to query a scheduling snapshot to determine a status of a job, including why a job is not currently executing, and when the job is scheduled to execute,
    wherein the information is configured to provide information associated with an iteration regarding available resources, assigned resources, jobs pending, jobs executing, resource requirements for pending jobs, resources consumed by executing jobs, where in a queue a job resides, one or more policy constraints in place, and when a pending job is anticipated to execute.

10. The method of claim 9, wherein tracing scheduling decisions may be performed asynchronous to the resource scheduler.

11. The method of claim 9, wherein providing a user interface further comprises providing at least one from a group consisting of a menu interface, a window interface, and a command line interface.

12. The method of claim 9, wherein the user interface enables a plurality of users to query a same scheduling snapshot.

13. The method of claim 9, further comprising:
    if a scheduling snapshot in the plurality of scheduling snapshots is not associated with a current iteration of the resource scheduler and is further unassigned to at least one user, then deleting the scheduling snapshot.

14. A modulated data signal configured to include program instructions for performing the method of claim 9.

15. A system for use in managing a scheduling of jobs to resources, the system comprising a memory, wherein the memory comprises:
    a scheduling trace interface component that is programmed to perform actions, including:
    tracing a plurality of scheduling decisions performed in iteratively scheduling jobs to resources, wherein the trace further comprise information associated with the of the scheduling decisions; and iteratively providing the scheduling decisions and the information to one of a plurality of scheduling snapshots, wherein each scheduling snapshot is associated with a different scheduling iteration; and a user interface that is configured to enable a user to access one of the plurality of scheduling snapshots and perform actions, including:

requesting status of a job based on contents of the accessed scheduling snapshot, wherein the status includes at least whether the job is currently executing, scheduled to execute, and about when the job is scheduled to execute; and querying why the job is not currently executing based on contents of the accessed scheduling snapshot, wherein the why includes what resource is currently unavailable to the job, and when is the resource expected to become available to the job, wherein the content of scheduling snapshot further comprises information regarding a policy constraint on the job, a licensing constraint on the job, resources available unconsumed by another job during the iteration, a resource requested by the job, and when a requested but consumed resource is expected to become available to the job.

16. The system of claim 15, wherein the resources further comprises at least one of a resource within a compute farm, and a resource within a single computing device.

17. The system of claim 15, wherein the scheduling decisions further comprise at least one of load balancing a plurality of servers, and managing jobs within a personal computer, and wherein the user interface further comprises a command line interface (CLI).

* * * * *

UNITED STATES PATENT AND TRADEMARK OFFICE
CERTIFICATE OF CORRECTION

| | | |
|---|---|---|
| PATENT NO. | : 8,776,065 B2 | Page 1 of 1 |
| APPLICATION NO. | : 11/601115 | |
| DATED | : July 8, 2014 | |
| INVENTOR(S) | : Podila | |

It is certified that error appears in the above-identified patent and that said Letters Patent is hereby corrected as shown below:

In the Specification

Column 5, line 59, delete "and or" and insert -- and/or --, therefor.

Column 5, line 63, delete "NETheui," and insert -- NETbeui, --, therefor.

Column 12, line 10, delete "use" and insert -- used --, therefor.

Column 12, line 34, delete "aw" and insert -- as --, therefor.

In the Claims

Column 14, line 67, in Claim 15, before "scheduling" delete "of the".

Signed and Sealed this
Twenty-fourth Day of February, 2015

Michelle K. Lee
*Deputy Director of the United States Patent and Trademark Office*